United States Patent
Auflick et al.

(10) Patent No.: US 7,062,338 B1
(45) Date of Patent: Jun. 13, 2006

(54) TRACK ACCESS MANAGEMENT FOR LARGE PLAYLISTS IN A VEHICULAR MULTIMEDIA PLAYER

(75) Inventors: Jack L. Auflick, Westland, MI (US); David S. Cheney, White Lake, MI (US); Michael R. Remenak, Southgate, MI (US); Gregory R. Hamel, Livonia, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 847 days.

(21) Appl. No.: 10/076,230

(22) Filed: Feb. 14, 2002

(51) Int. Cl.
*G06F 17/00* (2006.01)
*H04B 1/00* (2006.01)

(52) U.S. Cl. .......................... 700/94; 381/86
(58) Field of Classification Search ............ 369/30.01, 369/30.06, 30.08, 30.09; 700/94; 381/89; 345/645
See application file for complete search history.

(56) References Cited

U.S. PATENT DOCUMENTS

| | | | |
|---|---|---|---|
| 5,457,669 A | 10/1995 | Kim et al. | |
| 5,570,340 A | 10/1996 | Lee et al. | |
| 5,890,910 A | 4/1999 | Tsurumi et al. | |
| 6,023,706 A | 2/2000 | Schmuck et al. | |
| 6,122,646 A | 9/2000 | Igarashi et al. | |
| 6,247,130 B1 | 6/2001 | Fritsch | |
| 6,248,946 B1 * | 6/2001 | Dwek | 84/609 |
| 6,356,971 B1 * | 3/2002 | Katz et al. | 710/301 |
| 6,380,947 B1 * | 4/2002 | Stead | 345/645 |
| 6,487,145 B1 * | 11/2002 | Berhan | 369/30.15 |
| 6,745,199 B1 * | 6/2004 | Morita et al. | 707/102 |
| 2004/0010415 A1 * | 1/2004 | Seo et al. | 704/500 |
| 2004/0202335 A1 * | 10/2004 | Lee et al. | 381/86 |

OTHER PUBLICATIONS

Real Jukebox Plus Manual; 1999.*

* cited by examiner

*Primary Examiner*—Sinh Tran
*Assistant Examiner*—Andrew Flanders
(74) *Attorney, Agent, or Firm*—MacMillan, Sobanski & Todd, LLC

(57) ABSTRACT

An audio multimedia player has dual access modes for navigating between track selections contained in a large storage media, such as a compact disc CD-ROM having compressed audio files. The disc may includes numerous directories for organizing the audio files, but the player has insufficient display resources to show the directories themselves. In a flat file mode, all target audio file on the disc are included in a sequential numbering scheme which ignores any directory structure. In a directory mode, all directories are collapsed onto a single directory level in which subdirectories are moved up to the same top level as all other directories. The directories are sequentially numbered and then the target audio files within each directory are sequentially numbered.

13 Claims, 5 Drawing Sheets

| Path to Track | Flat File No. | Directory No. |
|---|---|---|
| \coolsong.mp3 | T001 | 01-01 |
| \rocksong.mp3 | T002 | 01-02 |
| \Rock\specialsong.mp3 | T003 | 02-01 |
| \Rock\Classics\oldsong.mp3 | T004 | 03-01 |
| \Classical\Piano\sonata01.mp3 | T005 | 04-01 |
| \Classical\Piano\sonata02.mp3 | T006 | 04-02 |
| \Classical\Piano\sonata03.mp3 | T007 | 04-03 |
| \Classical\Piano\sonata04.mp3 | T008 | 04-04 |
| \Classical\Opera\aria.mp3 | T009 | 05-01 |
| \Classical\Opera\chorus.mp3 | T010 | 05-02 |
| \Classical\Opera\first act.mp3 | T011 | 05-03 |
| \Swing\swingsong.mp3 | T012 | 06-01 |

Fig. 5

| Button Press | Display |
|---|---|
|  | T001 |
| Seek-Up | T002 |
| MP3 DIR | 01-02 |
| DIR-Down | 06-01 |
| DIR-Down | 05-01 |
| Seek-Up | 05-02 |
| MP3 DIR | T010 |
| Seek-Down | T009 |
| Seek-Down | T008 |
| MP3 DIR | 04-04 |

Fig. 6

TRACK ACCESS MANAGEMENT FOR LARGE PLAYLISTS IN A VEHICULAR MULTIMEDIA PLAYER

CROSS REFERENCE TO RELATED APPLICATIONS

This application is related to co-pending U.S. application Ser. No. 10/078,715, entitled "Fast Seek Between Multiple Selections In a Multimedia Player", now U.S. Pat. No. 6,700,839, issued Mar. 2, 2004, and to co-pending U.S. application Ser. No. 10/078,615, entitled "Rotary Control for Quick Playlist Navigation in a Vehicular Multimedia Player," now U.S. Pat. No. 6,820,238, issued Nov. 16, 2004.

STATEMENT REGARDING FEDERALLY SPONSORED RESEARCH

Not Applicable.

BACKGROUND OF THE INVENTION

The present invention relates in general to multimedia entertainment systems, and, more specifically, to an audio multimedia player having dual access modes for navigating between track selections contained within a playlist.

With the emergence of techniques such as MP3 for compressing digital audio files, the number of track selections (e.g., songs) stored on a single medium (e.g., a compact disc, a hard disk drive, or a flash memory card) can become very large. For example, a compact disc (CD) with a capacity of 650 megabytes can store more than 10 hours of recorded music in many hundreds of separate MP3-encoded files. The MP3 format is formally called MPEG-1 layer 3, which was adopted by the Moving Picture Experts Group jointly operated by the International Standards Organization (ISO) and the International Electro-Technical Commission (IEC). A digital audio file with this encoding has a file extension of "mp3". Many users are compiling extensive libraries of MP3 material for playing from their computers and from dedicated media players.

Other compression technologies are also known, such as AAC, which allow many individual digital audio tracks to be stored in the same individual unit of media. Furthermore, storage capacity of various media types (such as hard disk drives) are increasing to the point where large numbers of uncompressed files can be stored and simultaneously accessible to a player.

Media players for such digital audio media must provide ways in which the user of the media player can navigate to (i.e., choose) a desired selection for reproduction. In mobile applications, such as a personal handheld unit or an automotive entertainment system, the number of user controls and/or display sizes may be limited. Due to the large number of selections that may be in a particular playlist (i.e., a grouping of audio selections active within a player), the user must be able to rapidly move within the playlist. However, ways have been lacking for fast, simple, and efficient navigation among selections using an uncomplicated interface (e.g., a small number of push buttons and a display having few character spaces).

A typical user of MP3 files, for example, creates song collections in a personal computer environment, which has a rich user interface allowing for simultaneous display of large playlists and easy navigation. The files are normally stored in a directory-based file system within a hard disk drive of the personal computer. Files may be separated into many levels of directories and subdirectories in order to better organize and retrieve them.

For listening with a portable MP3 player, files are transferred from the computer hard drive to removable storage (e.g., a CD-ROM disc or a memory card or stick) or directly to internal memory of the portable MP3 player (e.g., via a USB connection). Especially when transferred (i.e., burned) to a CD-ROM disc, use of intricate directory structures may still be desirable to help cope with the large capacity of the disc. In an automotive audio player or other small, portable devices, the user interface is too small (i.e., lacks sufficient numbers of characters) to display directory structures that may be on a particular disc.

SUMMARY OF THE INVENTION

The present invention has the advantage of providing selectable display and navigation modes to allow management of track selections either using directory groupings or a flat file mode ignoring any directory information.

In one aspect of the invention, a method is provided for organizing digital audio tracks on a predetermined media for selection by an audio player, wherein the predetermined media stores the digital audio tracks in a directory-based file system. The predetermined media is scanned to locate each of the digital audio tracks and to determine a total number of tracks. The digital audio tracks are numbered with a flat-file selection number from a first flat-file selection number to a last flat-file selection number in a flat file mode. Each directory is numbered within the file system containing at least one of the digital audio tracks from a first directory number to a last directory number in a single-level directory mode. The digital audio tracks are numbered within each numbered directory with an in-directory selection number from a respective first in-directory selection number to a respective last in-directory selection number. Either the flat file mode or said directory mode is selected. When in the flat file mode, a user searches for a desired digital audio track by sequentially navigating through the flat-file selection numbers. When in the directory mode, the user selects a desired directory and then searches for a desired digital audio track by sequentially navigating through the in-directory selection numbers.

BRIEF DESCRIPTION OF THE DRAWINGS

FIG. 5 shows an index table resulting from the scanning of a disc.

FIG. 6 shows successive contents of the display during navigation of a disc.

DETAILED DESCRIPTION OF PREFERRED EMBODIMENTS

Figure 1:
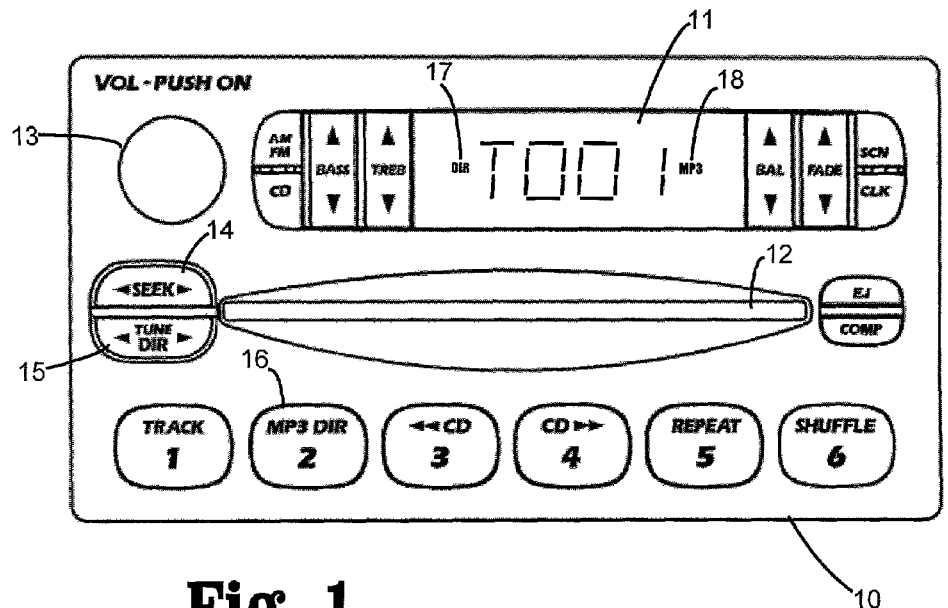
FIG. 1 is a front, plan view of a media player of the present invention.

Referring now to FIG. 1, a media player 10 may comprise a multimedia AM/FM/CD/CDDJ/MP3 player for installation in an automotive instrument panel, for example. A control panel of media player 10 includes a multi-character, segmented display 11 having character segments for displaying selection identifying data (e.g., track number, file name, etc.). Display 11 also contains special icons for illumination during specific conditions (e.g., an "MP3" icon 18 to indicate that an MP3 media is being played and a "DIR" icon 17 to illuminate when the player is in a directory mode, as explained later).

A slot 12 receives a CD-ROM compact disc having digital audio files (e.g., MP3 files) stored thereon. Preferably, slot 12 also accepts standard CD-Audio discs for reproduction of CD tracks. A remote disc jockey (CDDJ) may also be controlled by media player 10, and CD-ROM discs containing MP3 files may be loaded into and reproduced from the CDDJ located remotely from the control panel.

The control panel of media player 10 includes a combination rotary/push button knob 13 for turning the unit on and off and for adjusting the playing volume. The user control interface also includes other push buttons including a seek rocker switch 14, a tune rocker switch 15, and a preset/directory button 16. Seek rocker switch 14 produces a seek-down command when its left end is pressed and a seek-up command when its right end is pressed. Directory rocker switch 14 produces a previous-directory command when its left end is pressed and a next-directory command when its right end is pressed. Push button 16 toggles between a flat-file mode and a directory mode as described below.

Figure 2:
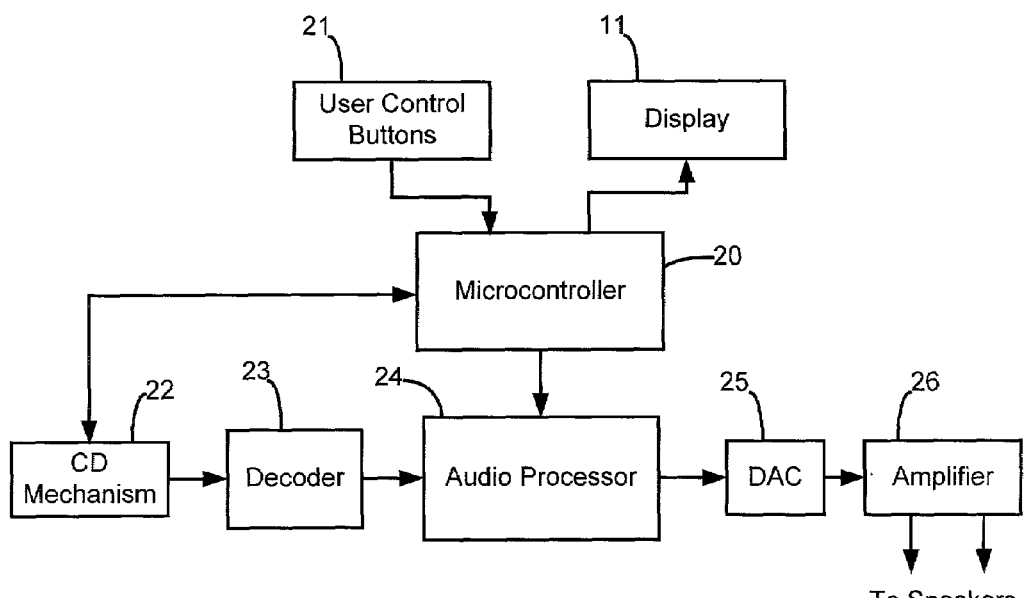
FIG. 2 is a block diagram showing main components of the media player of FIG. 1.

FIG. 2 shows some of the functional components of media player 10. A microcontroller 20 coordinates the media player operation. Microcontroller 20 implements a human-machine interface together with display 11 and user control buttons 21 (including switches 13–16). A CD mechanism 22 includes disc transport, laser pick-up, data detection and formatting, error checking, and other functions. Digital data from compressed audio files are provided to a decoder 23 which decompresses the audio information and provides it to an audio processor 24. Other audio sources may also be included to provide additional audio signals to audio processor 24, such as AM and FM tuners and a CD-Audio output from CD mechanism 22 which bypasses decoder 23. Audio processor 24 performs commonized audio functions such as tone control and volume control, and may be comprised of a digital signal processor (DSP), for example. Processed digital audio signals are converted to analog signals in a digital-to-analog converter (DAC) 25. The analog audio signals are amplified in a power amplifier 26 and coupled to speakers (not shown) for audible reproduction.

Figure 3:
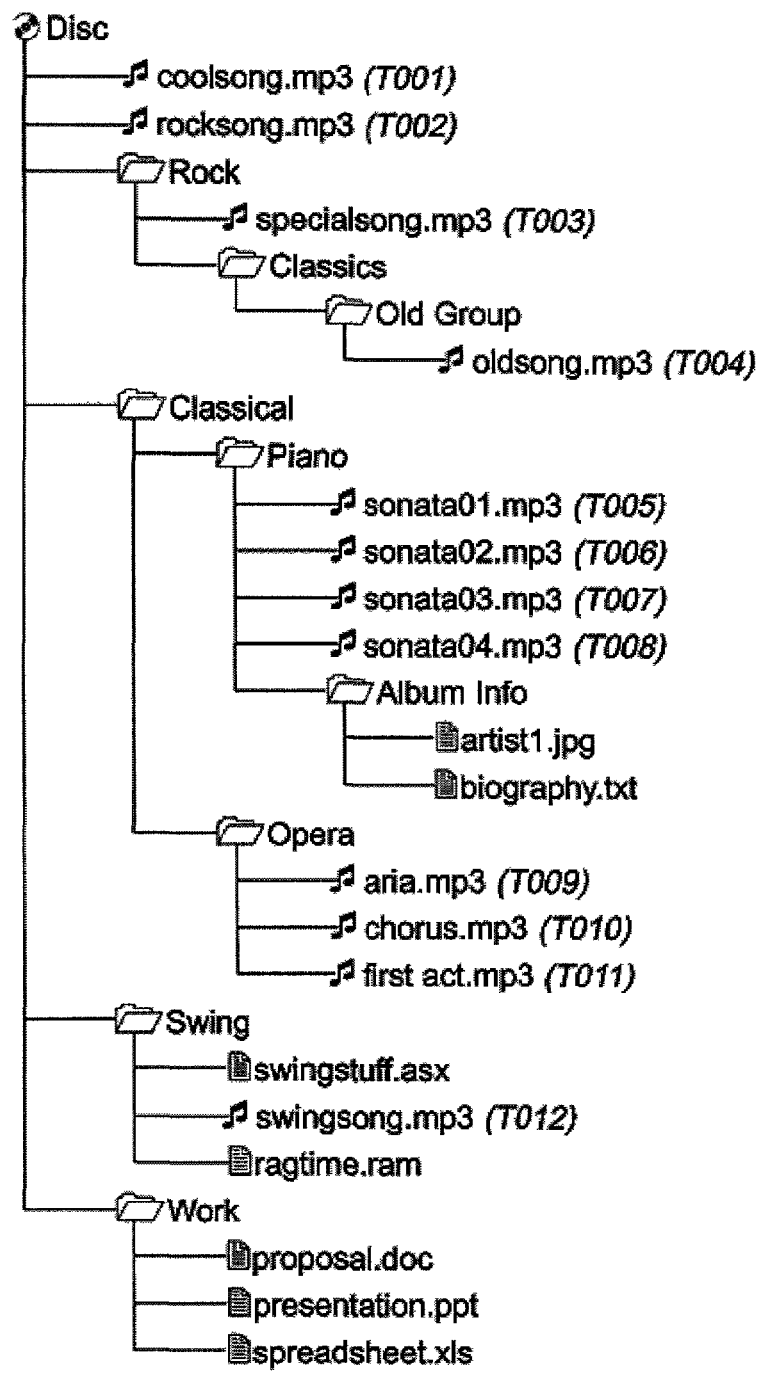
FIG. 3 shows an example of the contents of a compact disc and the selection number assignments in a flat-file mode of the media player.
Figure 4:
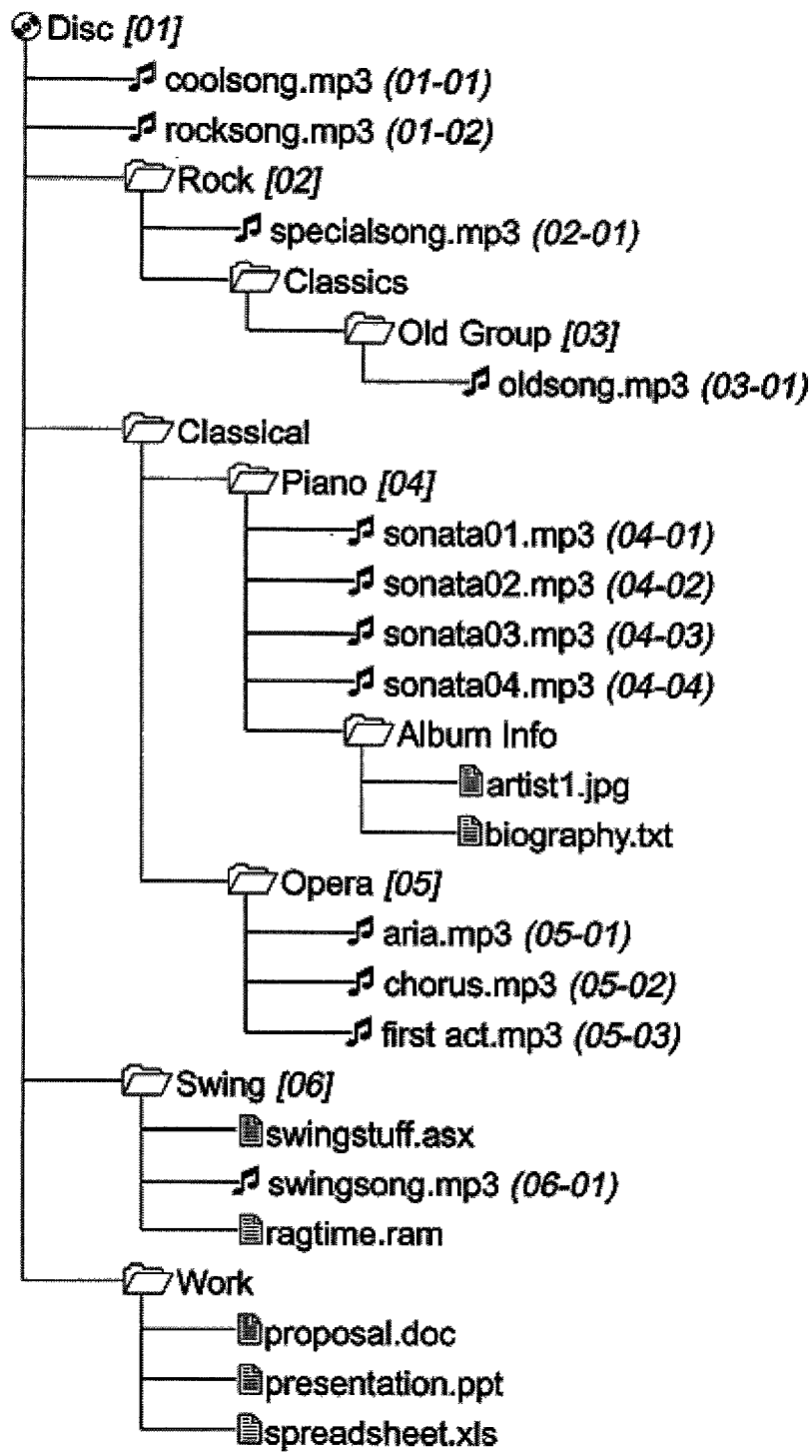
FIG. 4 shows the selection number assignments of the compact disc of FIG. 3 in a directory mode of the media player.

The present invention provides direct access to selections (e.g., songs) within a playlist. The playlist may comprise any ordered (e.g., numbered) listing of files. FIGS. 3 and 4 show how an arbitrary collection of files on a storage media (e.g., a CD-ROM disc) with any directory or folder structure may be scanned by a media player and assembled into an ordered structure that can be navigated using the few characters available on display 11.

Each user created disc may contain playable target files for reproduction (e.g., MP3 files) within various directory structures and mixed with other non-playable types of files. FIGS. 3 and 4 show the contents of the same example disc organized by the player into a flat-file playlist structure and a single-level directory playlist structure, respectively. The example disc has two selections in its root directory: coolsong.mp3 and rocksong.mp3. There are four first level folders designated Rock, Classical, Swing, and Work. The folders contain target MP3 files and various subfolders, some of which contain other target MP3 files or additional subfolders.

Due to display and control limitations of the media player shown in FIG. 1, two alternative display modes are preferably created in the preferred embodiment. As shown in FIG. 3, a flat-file mode assigns a number to each target file sequentially in a single list spanning the entire disc. In the display, each sequential file number is preceded by the letter "T" to indicate absolute track number. Thus, the MP3 files in FIG. 3 are associated with selection numbers T001 through T012.

As shown in FIG. 4, the directory mode assigns a number to each folder or subfolder (including the root directory) that contains a target file. Thus, the original folder structure is collapsed into a single-level structure of directories. Then within each directory, the target files are numbered sequentially, starting at one. The selection identifying data to be shown on the display includes the directory number followed by the selection number (e.g., 01-01).

In order to manage access to the various tracks according to either the flat file mode or the directory mode, the microcontroller in a preferred embodiment scans the disc and creates an index table as shown in FIG. 5. The microprocessor allocates sufficient memory space for the index table to contain information for the total number of tracks found on the disc. Each index table entry includes the path where an individual track is located, its assigned flat-file selection number, and its assigned directory-mode selection number. The first track found during the disc scan of this example is "coolsong.mp3" which is in the root directory of the disc. It is assigned flat-file selection number T001. The root directory is assigned directory number 01 and "coolsong.mp3" is assigned in-directory selection number 01, resulting in a directory-mode selection number of 01-01. The track "rocksong.mp3" is also in the root directory. It is represented by either track T001 or track 01-02 in the flat file and directory modes, respectively. The directory "Rock" is in the first level below the root directory and is assigned a directory number 02. The track "specialsong.mp3" in that directory is assigned T003 and 02-01 designations. The directory "Classics" which is a subdirectory of "Rock" is assigned a directory number 03, and so on. Depending upon the search strategy employed, the actual ordering of tracks and/or directories may vary. However, it facilitates ease of use to provide some consistencies, such as the root directory always being numbered directory #1.

Following the disc scanning operation, the flat-file selection numbers or the directory-mode selection numbers are shown on the display. When searching for another track, the user control buttons are manipulated in order to sequentially navigate between selection numbers within the currently active mode. For example, a seek button may be pressed and held until a desired track selection number is displayed. When the button is released, the displayed selection number is maintained, the microprocessor retrieves the corresponding path from the index table, and the target file is decoded and played.

Immediately after scanning a disc, the first track is preferably displayed. The player may default to one mode (e.g., to flat file mode) or may automatically select the mode from the most recent time that an MP3 disc was played. FIG. 6 shows a navigation example following initialization in flat file mode with track T001 being displayed. Moving downward in the table of FIG. 6, the display (and corresponding track being reproduced) is updated according to the user control button that is pressed. By pressing the "Seek-up" button, the player goes to track T002. The "MP3 DIR" button is pressed in order to change into directory mode, causing the display to change to 01-02. This is still the same actual track, and it continues to play without interruption. The "DIR-Down" button may then be held down long enough for the display to scroll through directory-mode selection numbers 06-01 and 05-01, and is released while 05-01 is displayed. Next, the "Seek-up" button is pressed and the track changes to 05-02. Continuing with the example, the "MP3 DIR" button is pressed to revert to flat file mode. The display is updated to T010 but the playing of the track is not affected. The "Seek-down" button is shown as being pressed twice more to access tracks T009 and T008. When the "MP3 DIR" button is again pressed, the display shows 04-04 in this example.

Figure 7:
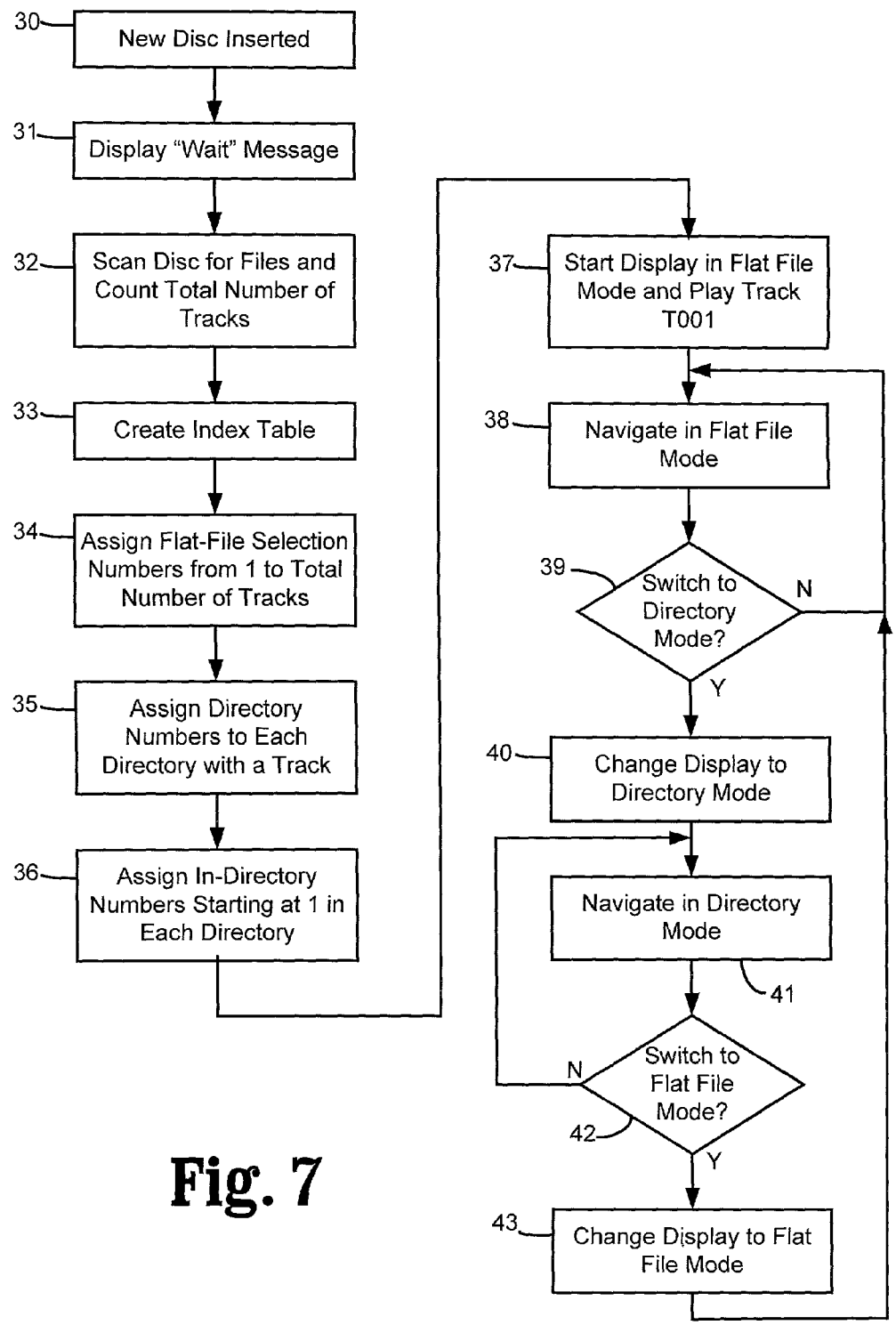
FIG. 7 is a flowchart showing a preferred embodiment of track access management using the flat file mode and directory mode of the present invention.

On overall method of the present invention is shown in FIG. 7. In step 30, a CD-ROM disc containing encoded audio files is inserted into the audio player. In step 31, a "Wait" message is displayed and remains on the display for the duration of the scanning of the disc. Depending upon the number of directories and tracks on the disc, it may take a minute or more to scan a disc and to compile the index table. Thus, it may be desirable to show activity on the display to show that the player has not malfunctioned. For example, display segments for showing volume level may be progressively illuminated to suggest scanning progress.

In step 32, the player scans the disc to identify each file with the appropriate file extension (e.g., ".mp3") and to count the total number of tracks. The index table is created or sized in step 33. In step 34, the scanned tracks are assigned a flat-file selection number from a first flat-file selection number (e.g., 1) to a last flat-file selection number (e.g., the number of total tracks).

In step 35, the player assigns directory numbers to each directory found on the disc that contains a target digital audio track. A directory is counted only if it contains a track at that level. Thus, a directory is not counted if it only contains subdirectories with target tracks (e.g., the "Classical" directory in FIG. 4). In step 36, in-directory numbers are assigned to the tracks within each numbered directory. In-directory numbers start at 1 in each directory and continue up to the number of tracks in the directory. Other numbering or enumerating schemes could also be used (e.g., a sequential lettering could be used).

Once the scanning operation has finished, the Wait message can be terminated and the display is started in flat file mode in step 37 while playing track T001. While in flat file mode in step 38, manipulating the user control buttons provides navigation within the flat file mode (i.e., searching for a desired track by sequentially navigating through the flat-file selection numbers). A check is made in step 39 to determine whether the "MP3 DIR" button was pressed to cause a switch to directory mode. If not, then navigation continues in the flat file mode in step 38. Otherwise, the mode of the display is changed to directory mode in step 40. Thereafter, navigation is performed in directory mode in step 41. A check is made in step 42 to determine whether the "MP3 DIR" button was pressed to cause a switch to flat file mode. If not, then navigation continues in the directory mode in step 41. Otherwise, the mode of the display is changed to flat file mode in step 43 and a return is made to step 38.

What is claimed is:

1. A method of organizing digital audio tracks on a predetermined media for navigation and selection by a user of an audio player having a display, said predetermined media storing said digital audio tracks in a directory based file system, said method comprising the steps of:
    scanning said predetermined media to locate each of said digital audio tracks and to determine a total number of tracks;
    numbering said digital audio tracks with a flat-file selection number from a first flat-file selection number to a last flat-file selection number in a flat tile mode;
    numbering each directory within said file system containing at least one of said digital audio tracks from a first directory number to a last directory number in a single-level directory mode;
    numbering digital audio tracks within each numbered directory with an in-directory selection number from a respective first in-directory selection number to a respective last in-directory selection number;
    said user selecting either said flat file mode or said directory mode;
    when in said flat file mode, said audio player displaying said flat-file selection numbers and said user searching for a desired digital audio track by sequentially navigating through said flat-file selection numbers; and
    when in said directory mode, said audio player displaying said directory numbers and said in-directory selection numbers and said user selecting a desired directory and then searching for a desired digital audio track by sequentially navigating through said in-directory selection numbers; and
    wherein said display has the ability to display a maximum of one selection number at a time.

2. The method of claim 1 wherein said first flat-file selection number equals 1 and said last flat-file selection number equals said total number of tracks.

3. The method of claim 1 wherein said first in-directory selection number in each respective numbered directory is equal to 1.

4. The method of claim 3 wherein each respective last in-directory selection number is equal to a total number of said digital audio tracks contained within its respective directory.

5. The method of claim 1 wherein said scanning step is comprised of compiling and storing in an index table a respective flat-file selection number, a directory number, and an in-directory selection number assigned to each digital audio track found during said scanning.

6. The method of claim 1 wherein said digital audio tracks are identified by a respective file extension in their respective file names of said file system.

7. The method of claim 6 wherein said digital audio tracks are encoded as MP3 files.

8. The method of claim 1 wherein said predetermined media is comprised of a CD-ROM disc.

9. An audio player for reproducing selections from a predetermined media containing digital audio tracks stored in a directory based file system, said audio player comprising:
    an alphanumeric display showing selection number identifying data;
    a user control interface for selecting either a flat-file mode or a directory mode and for navigating sequentially through said selection number identifying data in each of said modes; and a controller for scanning said predetermined media to locate each of said digital audio tracks and to determine a total number of tracks, for numbering said digital audio tracks with a flat-file selection number from a first flat-file selection number to a last flat-file selection number in said flat file mode, for numbering each directory within said file system containing at least one of said digital audio tracks from a first directory number to a last directory number in said directory mode, for numbering digital audio tracks within each numbered directory with an in-directory selection number from a respective first in-directory selection number to a respective last in-directory selection number, for causing said display to show said flat-file selection number when in said flat file mode, and for causing said display to show said directory number and said in-directory selection number when in said directory mode;

wherein, when in said flat file mode, said controller is responsive to said user control interface for searching for a desired digital audio track by sequentially navigating through said flat-file selection numbers; and wherein, when in said directory mode, said controller is responsive to said user control interface for selecting a desired directory and then for searching for a desired digital audio track by sequentially navigating through said in-directory selection numbers; and wherein said display has the ability to display a maximum of one selection number at a time.

10. The audio player of claim 9 wherein said display further shows an indicator according to a one of said flat file mode or said directory mode that is selected at a particular time.

11. The audio player of claim 9 wherein said selection number identifying data for said directory mode is comprised of a directory number followed by an in-directory selection number.

12. The audio player of claim 9 wherein said display further shows a wait message during said scanning of said predetermined media.

13. The audio player of claim 9 further comprising:

an index table compiled during said scanning of said predetermined media for storing a respective flat-file selection number, a directory number, and an in-directory selection number assigned to each digital audio track found during said scanning.

* * * * *